United States Patent [19]

Nomura et al.

[11] Patent Number: 5,642,926
[45] Date of Patent: Jul. 1, 1997

[54] PROJECTOR OF REFLECTION TYPE

[75] Inventors: Masaaki Nomura; Soichiro Kimura, both of Saitama, Japan

[73] Assignee: Fuji Photo Film Co., Ltd., Kanagawa, Japan

[21] Appl. No.: 715,630

[22] Filed: Sep. 18, 1996

[30] Foreign Application Priority Data

Sep. 27, 1995 [JP] Japan .................................. 7-248971

[51] Int. Cl.$^6$ .................................................. G03B 21/14
[52] U.S. Cl. ........................ 353/103; 353/65; 353/DIG. 4
[58] Field of Search .................................. 353/103, 104, 353/114, DIG. 3, DIG. 1, DIG. 4, 65, 66, 63

[56] References Cited

U.S. PATENT DOCUMENTS

| 5,059,020 | 10/1991 | Genieis ............................ 353/103 |
| 5,172,145 | 12/1992 | Stephenson ..................... 353/103 |
| 5,440,362 | 8/1995 | Jones ................................ 353/103 |
| 5,444,506 | 8/1995 | Nakazawa et al. ............... 353/103 |
| 5,446,511 | 8/1995 | Kitahara et al. .................. 353/103 |

FOREIGN PATENT DOCUMENTS

4-155323  5/1992  Japan .

Primary Examiner—William Dowling
Attorney, Agent, or Firm—Young & Thompson

[57] ABSTRACT

A projector of a reflection type has a transparent stage plate on which a transparent original sheet is set. A lamp illuminates the original sheet through the stage plate. A Fresnel mirror is laid on an upside of the original sheet, and reflects light from the original sheet in a convergent manner. The light from the Fresnel mirror is reflected away from the stage plate. The light is again reflected, and incident upon a projecting lens, which projects an image of the original sheet to a screen. A housing contains the Fresnel mirror in movable fashion. An inserting slot is formed in the housing, into which the original sheet is inserted during supply of the original sheet. Photo sensors operate to detect a front edge of the original sheet inserted through the inserting slot. It is also detected that the original sheet is set on the stage plate. An ejector switch is operated for ejection of the original sheet. A solenoid shifts the Fresnel mirror up away from a set position in response to a signal from the photo sensors or the ejector switch. The Fresnel mirror is shifted down to the set position in response to a sheet setting signal, to lie on the original sheet. A sheet feeder roller moves the original sheet from the inserting slot to the stage plate during the supply, and moves the original sheet out of the housing during the ejection of the original sheet.

17 Claims, 10 Drawing Sheets

PROJECTOR OF REFLECTION TYPE

BACKGROUND OF THE INVENTION

1. Field of the Invention

The present invention relates to a projector of a reflection type. More particularly, the present invention relates to a projector of a reflection type in which a transparent original can be set easily.

2. Description Related to the Prior Art

A reflection type of overhead projector is used for presentation of an image to a considerable number of viewers. A projector body has a top face as a stage, where a transparent sheet or original is placed. When the overhead projector is used, a projector head is set above the stage and at the top of a stay. The projector head protrudes over the projector body in such an extended manner that it is likely to obstruct a view of some of the viewers.

JP-A 4-155323 discloses a reflection type of projector in which the projector body incorporates elements of the projector head inclusive of a lamp, a flat mirror and a projecting lens, and which is characterized in a reduced thickness of the overall orientation during the use. The projector of the reflection type has a cabinet, having a top face in which an opening is formed. The opening is covered by a transparent stage plate to define the stage. An original sheet cover is mounted on the stage to cover the original sheet placed on the stage, and supported in openable fashion. A Fresnel mirror is fitted inside the sheet cover. When the sheet cover has a closed state, the Fresnel mirror is contacted on the original sheet. The projecting lens is disposed beside the cabinet, which incorporates the lamp and the flat mirror. The flat mirror reflects light from the lamp toward the original sheet. The light transmitted through the original sheet is reflected by the Fresnel mirror, and then reflected by the flat mirror again toward the projecting lens.

The projector of the reflection type, however, has a drawback of inefficient operation in that the sheet cover must be opened and closed each time the original sheet is set properly or adjusted in position during the projection. Problems lie in difficulties in positioning the original sheet. It is likely that the original sheet is shifted by wind pressure of the sheet cover when the sheet cover is closed with the original sheet placed on the stage. When the projector of the reflection type is installed in an inclined orientation, the original sheet is likely to drop away from the stage.

To solve those problems, there are plural suggestions of the projector of the reflection type having a sheet feeder unit. The sheet feeder unit is disposed on the top of the cabinet. Plural transparent originals are set on a feeder tray. The projector of the reflection type is remotely controlled to convey the original sheet to the stage.

The projector of the reflection type having the sheet feeder unit can be loaded with the plurality of transparent originals. Also a remote control device can be operated to exchange the original sheets one after another in a position distant from the projector of the reflection type. Those are advantages for the presentation by projecting images in a predetermined order in a large room or hall. However the projector of the reflection type with the sheet feeder unit is difficult to use for effecting presentation while the original sheet is corrected by handwriting or partially changed, or the order of the originals is changed, particularly in a small hall. An additional problem lies in high cost for incorporating the remote control device in the projector of the reflection type.

SUMMARY OF THE INVENTION

In view of the foregoing problems, an object of the present invention is to provide a projector of a reflection type in which an improved sheet feeder unit sets a transparent original easily.

In order to achieve the above and other objects and advantages of this invention, a housing contains a Fresnel mirror in movable fashion. An inserting slot is formed in the housing, for inserting a transparent original sheet into the housing during supply of the original sheet. A sheet detector detects a front edge of the original sheet inserted through the inserting slot. A position detector detects that the original sheet is set on a stage plate. An ejector switch is adapted to operation for ejection of the original sheet. A mirror shifter is disposed in the housing, for shifting the Fresnel mirror from a set position to a raised position in response to a signal from the sheet detector or the ejector switch, and for shifting the Fresnel mirror from the raised position to the set position in response to a signal from the position detector. The Fresnel mirror in the set position is laid on the original sheet, and the Fresnel mirror in the raised position is raised away from the stage plate. A sheet feeder mechanism is disposed in the housing, for moving the original sheet from the inserting slot to the stage plate during the supply, and for moving the original sheet out of the housing during the ejection of the original sheet.

In a preferred embodiment, a cabinet contains a light source, a mirror and a projecting lens. A stage opening is formed in the cabinet, and has the stage plate is secured therein. The housing is mounted on the cabinet in pivotal fashion.

The sheet detector includes at least one shiftable member, disposed inside the housing, pressed and shifted by a front edge of the original sheet being inserted in the inserting slot. At least one photo sensor is disposed inside the housing, for photoelectrically detecting a shift of the shiftable member, to recognize insertion of the front edge of the original sheet.

The at least one shiftable member comprises two shiftable members arranged along the inserting slot. The at least one photo sensor comprises two photo sensors arranged along the inserting slot. An orientation detector evaluates signals from the two photo sensors. If the signals are equal to each other, then the orientation detector determines that the original sheet is oriented acceptably. If the signals are different from each other, then the orientation detector determines that the original sheet is oriented in inclination.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
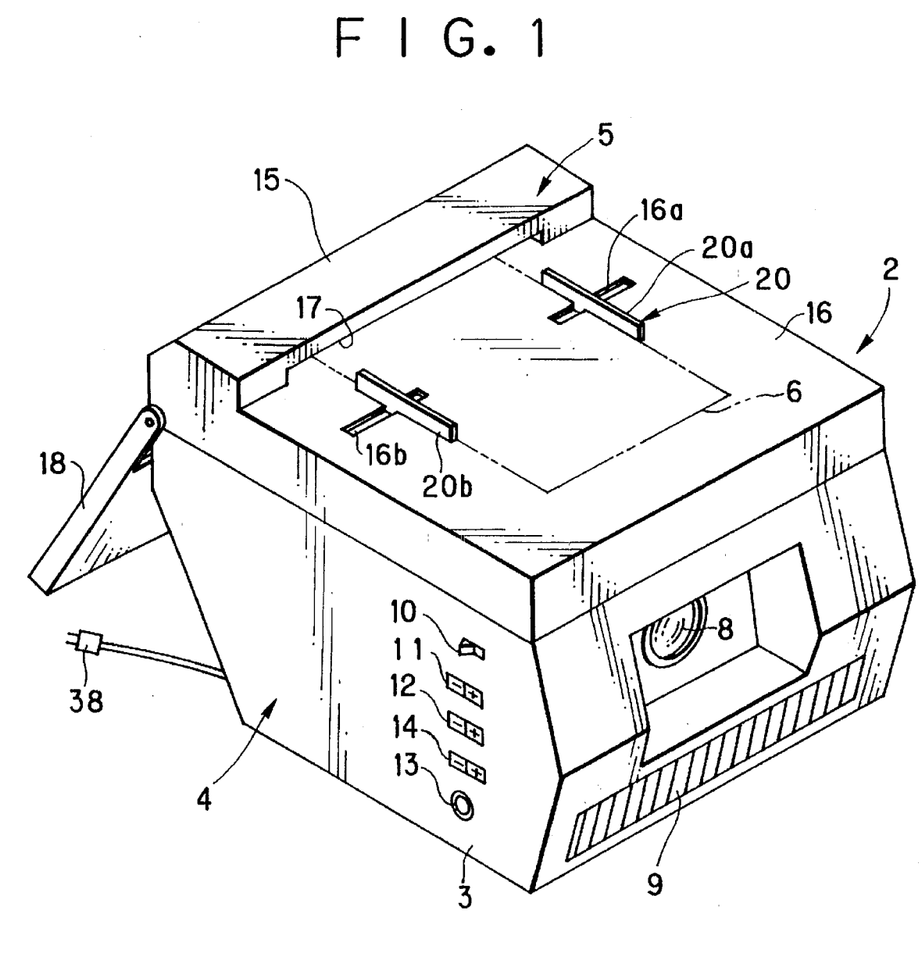
FIG. 1 is a perspective illustrating a projector of a reflection type according to the present invention.

In FIG. 1, a projector 2 of a reflection type is constituted by a projector body 4, and a sheet feeder unit 5 mounted on the projector body 4. The projector body 4 has a cabinet 3. The center of the front of the cabinet 3 has a projecting lens 8, through which an image on a transparent sheet or original 6 is projected to a screen 7 of FIG. 2. Under the projecting lens 8, there are slits 9 formed for exhausting air heated in the cabinet 3. A lateral face of the projector 2 has a power source switch 10, a focussing switch 11, a zooming switch 12, an ejector switch 13, and a fine adjustor switch 14. The fine adjustor switch 14 is depressed for finely adjusting a position of the original sheet placed on the stage.

The sheet feeder unit 5 includes a housing 15, a top flat face 16, a sheet guide rail mechanism 20, an inserting slot or inlet mouth 17, and a receptacle tray 18. The housing 15 incorporates a sheet feeder mechanism for feeding and exiting the original sheet 6, and a mirror shifter mechanism for shifting the Fresnel mirror up and down. The top flat face 16 is formed on the top of the housing 15, and receives the original sheet 6 placed thereon. The guide rail mechanism 20 operates to position the original sheet 6 on the top flat face 16. The inserting slot 17 receives a front edge 6a of the original sheet 6. The receptacle tray 18 is disposed on the rear of the housing 15, and receives a number of transparent originals after projection.

The guide rail mechanism 20 includes two guide rails 20a and 20b arranged in a direction of inserting the original sheet 6 on the top flat face 16. The guide rails 20a and 20b are slidable along respective slots 16a and 16b perpendicularly to the inserting direction. The guide rails 20a and 20b are slid suitably for orientation of the original sheet 6, either longitudinal or widthwise, with reference to the inserting slot 17. The original sheet 6 has the A4 size.

The guide rails 20a and 20b are linked together by a rack gear and a pinion gear under the top flat face 16. When the guide rail 20a is slid to the right in the drawing, the guide rail 20b is also slid to the left and by an amount of the guide rail 20a. Lateral edges of the original sheet 6 is contacted on the guide rails 20a and 20b to set the original sheet 6. The center of the original sheet 6 is inevitably set at the center of the inserting slot 17. A surface of the original sheet 6 having the image is oriented upwards on the top flat face 16. The single transparent original 6 is set at one time.

Figure 2:
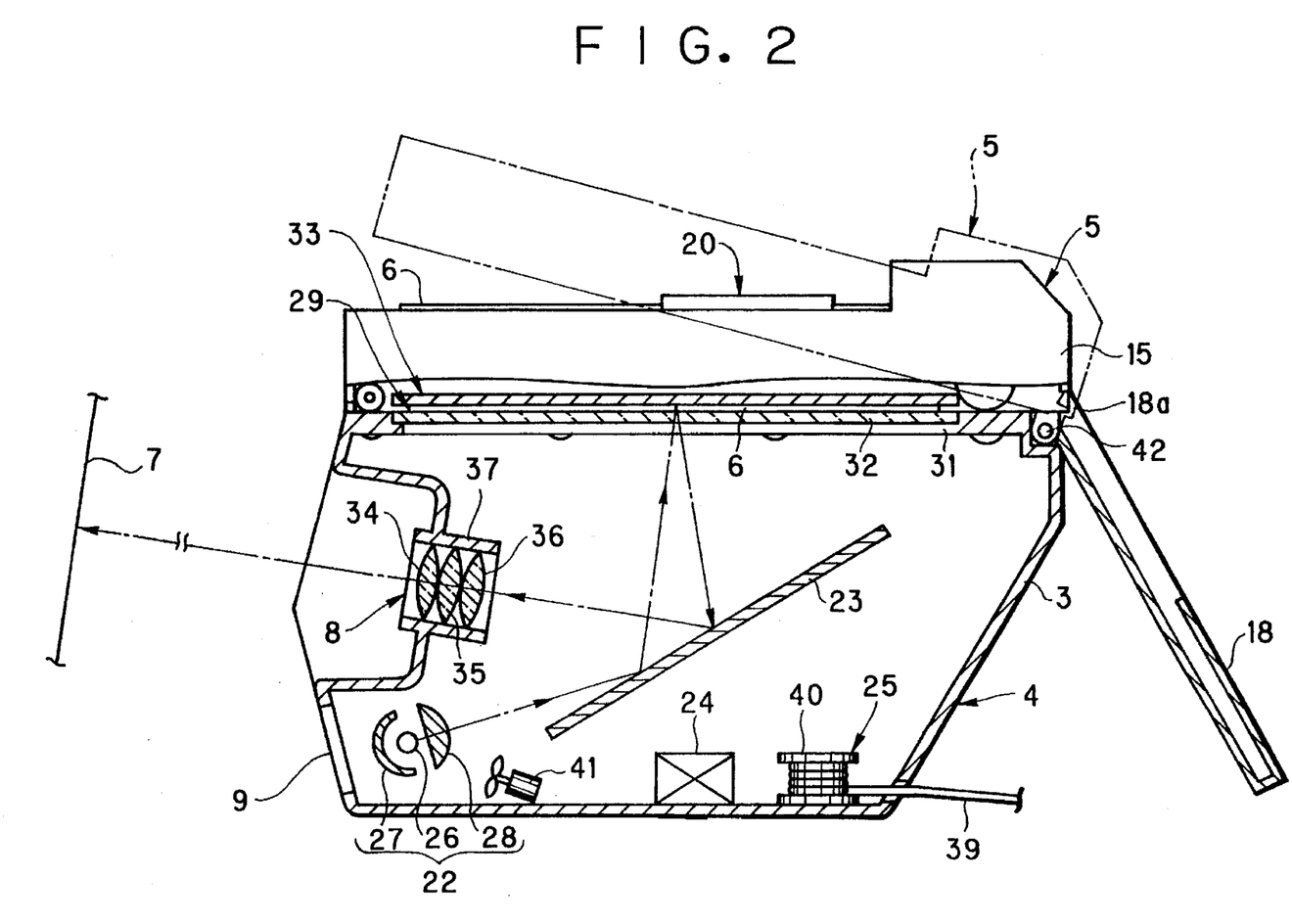
FIG. 2 is a vertical section illustrating the projector.

In FIG. 2, the cabinet 3 of the projector body 4 contains a projecting light source 22, a flat mirror 23, a control unit 24, and a power cable unit 25. The projecting light source 22 is constituted by a lamp 26, a reflector 27, and a condenser lens 28. The lamp 26 emits light to the flat mirror 23. The reflector 27 is disposed behind the lamp 26 for forwardly reflecting the light from the lamp 26. The condenser lens 28 condenses the light emitted by the lamp 26. The flat mirror 23 is disposed in inclination to reflect the light from the projecting light source 22 toward a stage 29 disposed at the top of the cabinet 3.

The stage 29 consists of a stage opening 31 formed in the cabinet 3 and a transparent stage plate 32 formed from glass. The original sheet 6 set on the top flat face 16 of the sheet feeder unit 5 is fed by the sheet feeder mechanism, and reversed, and moved to the stage plate 32. A Fresnel mirror 33 is incorporated in the sheet feeder unit 5, and superimposed on the original sheet 6 placed on the stage plate 32. The Fresnel mirror 33 includes a Fresnel lens or Fresnel base plate, and a reflective layer formed on the rear thereof. The light, reflected by the flat mirror 23 and transmitted through the original sheet 6, is reflected by the Fresnel mirror 33 in a convergent manner, so that the light comes incident upon the flat mirror 23 again.

The sheet feeder unit 5 incorporates the mirror shifter mechanism, which shifts the Fresnel mirror 33 up away from the stage 29 when the original sheet 6 is fed and ejected. A sufficient space is formed between the Fresnel mirror 33 and the stage plate 32 for allowing movement of the original sheet 6 without failure. When the feeding and ejection of the original sheet 6 is stopped, the Fresnel mirror 33 is set down on the stage 29. Note that the Fresnel mirror 33 is produced by forming a reflective layer on the rear of a transparent base plate, but can be produced by forming a reflective layer on the front of a base plate being opaque or transparent, and also can be constituted by a combination of a Fresnel lens and a mirror plate.

The light, reflected by the Fresnel mirror 33 and incident upon the flat mirror 23, is reflected by the flat mirror 23 and comes incident upon the projecting lens 8. The projecting lens 8 consists of a combination of three lens elements 34, 35 and 36, which are incorporated in a lens barrel 37. The projecting lens 8 is zoomed by moving the lens elements 35 and 36. Motors are associated with the projecting lens 8, and are driven for focussing and zooming. The motors are controlled by the control unit 24.

The control unit 24 is constituted of a power source circuit, a projector/feeder control circuit and an optical system control circuit. The projector/feeder control circuit controls the projector body 4 and the sheet feeder unit 5. The optical system control circuit controls operation of focussing. The lamp 26 of the projecting light source 22 and a motor for the sheet feeder unit 5 are connected to the control unit 24. The power cable unit 25 is constituted by a power source cable 39 and a reel 40. The power source cable 39 has a plug 38 on one end (See FIG. 1), and is wound on the reel 40 to be contained in the cabinet 3. A cooling fan 41 is disposed near to the projecting light source 22 for applying air to the projecting light source 22 to cool it. The air with the heat is let out through the slits 9 formed in the cabinet 3.

Figure 3:
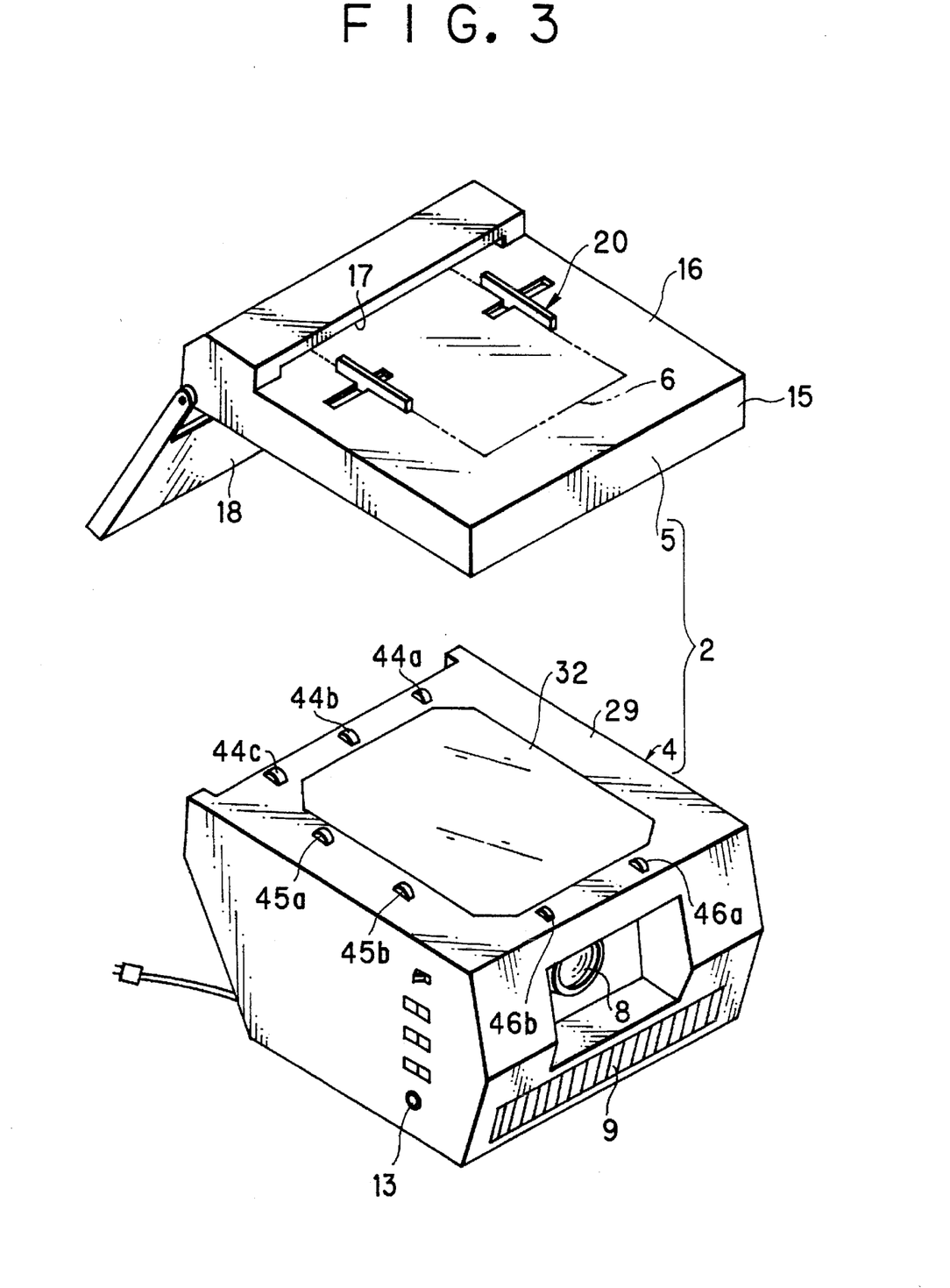
FIG. 3 is a perspective illustrating the projector and a sheet feeder unit detached from the projector.

The sheet feeder unit 5 is mounted on a shaft 42, which is disposed on the rear top of the cabinet 3. As indicated by the phantom line, the front of the sheet feeder unit 5 can be swung up manually. This makes it possible to place on the stage 29 a transparent original having a size greater than the inserting slot 17. When the shaft 42 is removed, the sheet feeder unit 5 is removable from the projector body 4 as illustrated in FIG. 3, to make it easy to inspect the projector body 4 and the sheet feeder unit 5 for maintenance. There are various cables (not shown), including the power source cable, connected between the sheet feeder unit 5 and the projector body 4 via connectors.

Figure 4:
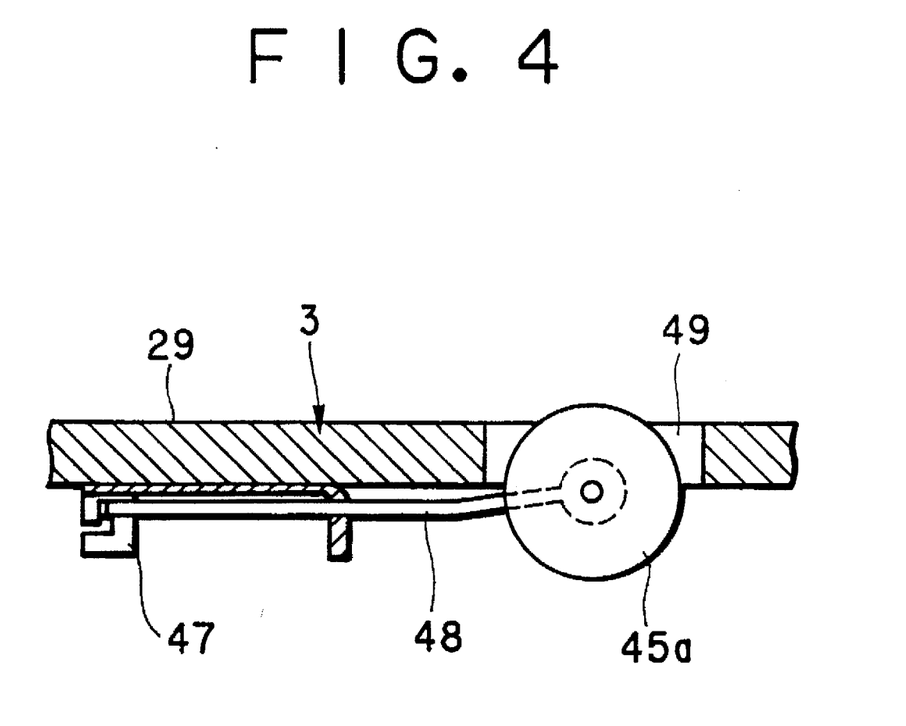
FIG. 4 is a section illustrating a state where each nip roller is mounted.

On the stage 29 are disposed driven rollers or nip rollers 44a, 44b, 44c, 45a, 45b, 46a and 46b. The nip rollers 44a, 44b and 44c are located behind the stage plate 32. The nip rollers 45a and 45b are located beside the stage plate 32. The nip rollers 46a and 46b are located in front of the stage plate 32. In FIG. 4, each of the nip rollers 44a–46b is connected to a spring 48, which is supported on a fixing pin 47 on a reverse face of a top wall of the cabinet 3. Each of the nip rollers 44a–46b is biased upwards by the spring 48. Each of the nip rollers 44a–46b emerges through a hole 49 formed in the top wall of the cabinet 3. On the stage 29, the original sheet 6 is squeezed between the nip rollers 44a–46b and the sheet feeder mechanism incorporated in the sheet feeder unit 5, while fed on the stage 29.

Figure 5:
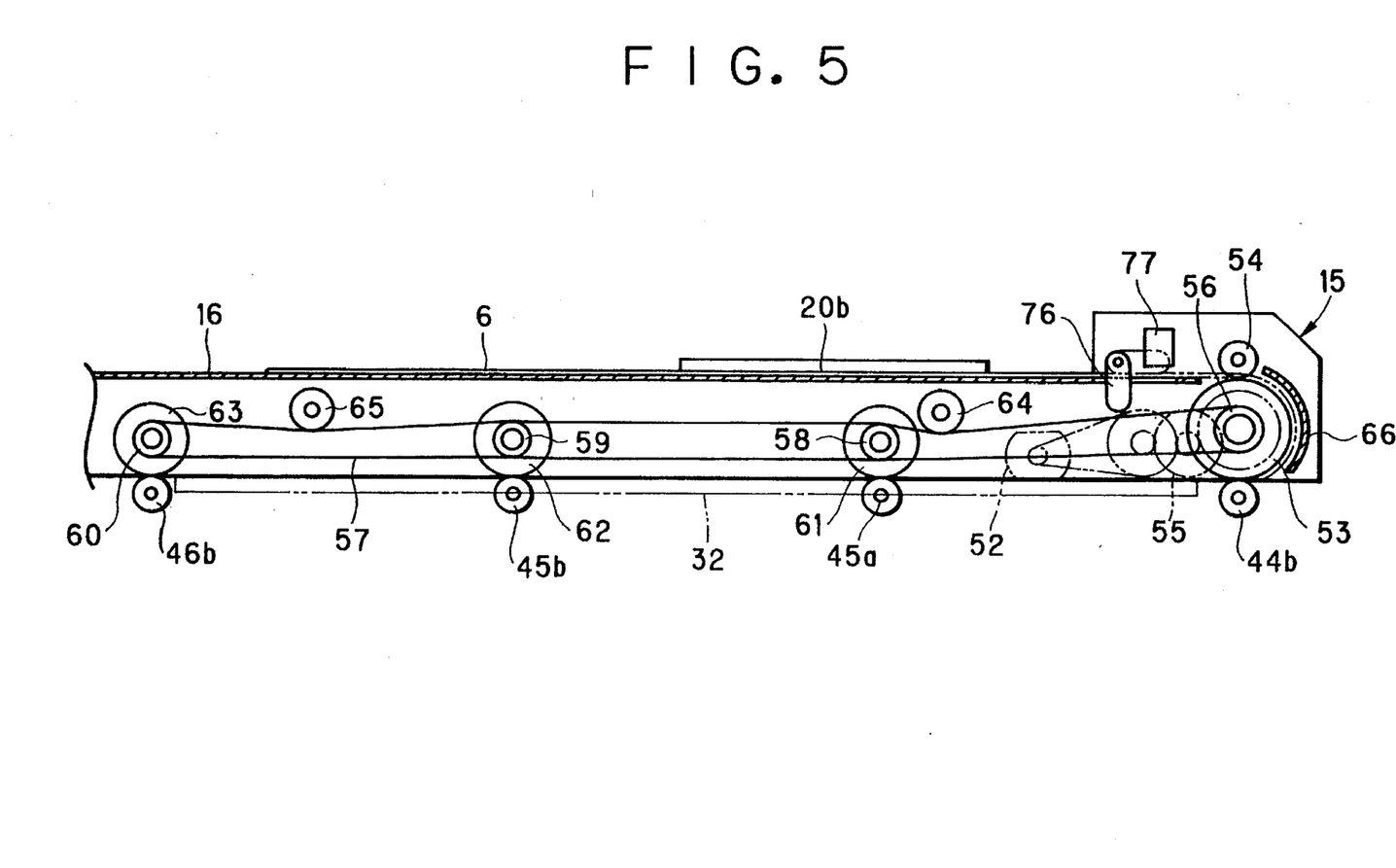
FIG. 5 is a vertical section illustrating a sheet feeder mechanism of the sheet feeder unit.

FIG. 5 illustrates the sheet feeder mechanism and one of two sheet detectors. The sheet feeder mechanism, after setting the original sheet 6 on the top flat face 16 and into the inserting slot 17, feeds the sheet feeder unit 5 with the original sheet 6 and moves the original sheet 6 to the stage 29. Also the sheet feeder mechanism ejects the original sheet 6 to the receptacle tray 18 through an exit slot 18a. The sheet feeder mechanism and the sheet detector are mounted on the housing 15.

The sheet feeder mechanism includes a motor 52, a gear train 55, one or more nip rollers 54, a belt 57, pulleys 58, 59 and 60, conveyor rollers 61 and 62, two conveyor rollers 63 and tension pulleys 64 and 65. The motor 52 operates as a motion source. The gear train 55 transmits rotation of the motor 52 to three feeder rollers 53. The nip rollers 54 are contacted on the feeder rollers 53. The belt 57 is supported about a pulley 56 which rotates coaxially with the feeder rollers 53. The pulleys 58–60 also supports the belt 57 thereabout. The conveyor rollers 61–63 are rotated respectively coaxially with the pulleys 58–60. The tension pulleys 64 and 65 are contacted on the belt 57, and apply tension to the belt 57. There is an arc-like guide plate 66 disposed to confront with the feeder rollers 53 for guiding the front edge 6a of the original sheet 6 to the stage 29.

The feeder rollers 53 are respectively confronted with the nip rollers 44a–44c partially projecting over the cabinet 3. The conveyor rollers 63 are respectively confronted with the nip rollers 46a and 46b. The conveyor rollers 61 and 62 are respectively confronted with the nip rollers 45a and 45b. When the original sheet 6 lies on the stage 29, the original sheet 6 is squeezed between the rollers 53, 61, 62 and 63 and the nip rollers 44a–46b.

When the motor 52 is rotated clockwise, the feeder rollers 53 are rotated in the same direction by the virtue of the gear train 55. The nip rollers 54 in contact with the feeder rollers 53 are rotated counterclockwise. The original sheet 6, of which the front edge 6a is inserted between the feeder rollers 53 and the nip rollers 54, is entered into the sheet feeder unit 5. The original sheet 6 is directed downwards by the guide plate 66.

The front edge 6a of the original sheet 6, conveyed in contact with the guide plate 66, is again squeezed between the feeder rollers 53 and the nip rollers 44a–44c, and moved to the stage 29. If the original sheet 6 has the longitudinal orientation in insertion on the top flat face 16, the original sheet 6 is conveyed on the stage 29 only by the feeder rollers 53 and the nip rollers 44a–44c. An interval between the feeder rollers 53 and the conveyor rollers 63 is set shorter than the length of the original sheet 6. On the stage 29, the front edge 6a of the original sheet 6 comes to be squeezed between the conveyor rollers 63 and the nip rollers 46a and 46b earlier than the rear edge of the original sheet 6 comes away from the feeder rollers 53 and the nip rollers 44a–44c.

To adjust the position of the original sheet 6 finely on the stage 29, the conveyor rollers 63 or the feeder rollers 53 are operated with reference to the position of the original sheet 6 at the time of the start of the adjustment. To eject the original sheet 6 to the receptacle tray 18, the feeder rollers 53 and the nip rollers 44a–44c are operated.

If the original sheet 6 has the widthwise orientation in insertion on the top flat face 16, the original sheet 6 is conveyed toward the stage 29 by the feeder rollers 53 and the nip rollers 44a–44c, and then by the conveyor rollers 61 and 62 and the nip rollers 45a and 45b, which are contacted on one of the lateral edges of the original sheet 6. To adjust the position of the original sheet 6 finely on the stage 29, the conveyor rollers 61 and 62 are operated with reference to the position of the original sheet 6. To eject the original sheet 6 to the receptacle tray 18, the feeder rollers 53 and the nip rollers 44a–44c are operated.

Figure 6:
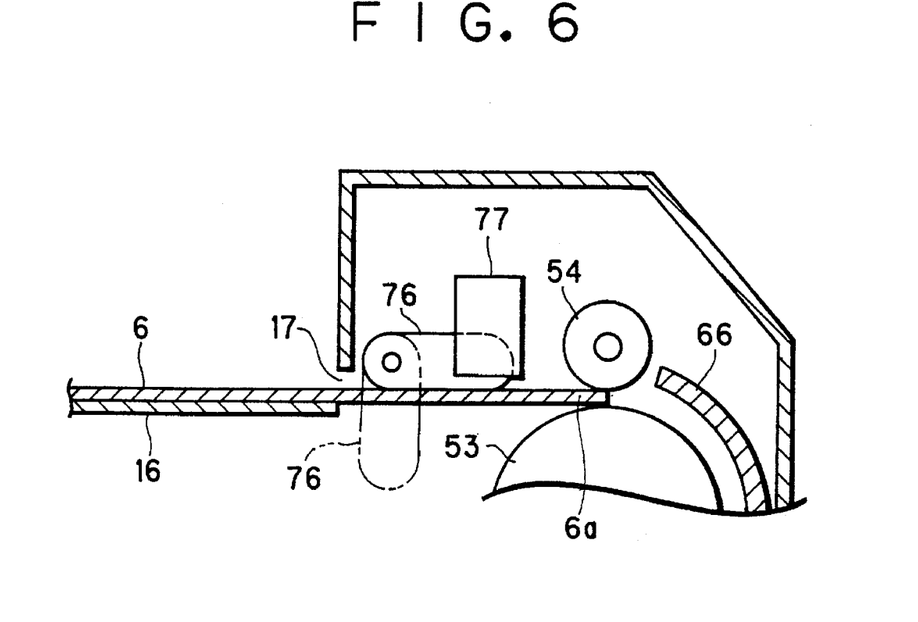
FIG. 6 is a vertical section, partially cutaway, illustrating a construction where a sheet detector is contained in the sheet feeder unit.

The sheet feeder mechanism starts being operated after the sheet detector detects the front edge 6a of the original sheet 6 and the mirror shifter mechanism finishes operating. The sheet detector is constructed by an opaque shiftable member 76 and a photo sensor 77. The shiftable member 76 has a top end supported on the housing 15 in rotatable fashion, and a bottom end disposed inside the inserting slot 17 and extended to the bottom of the inserting slot 17. The photo sensor 77 detects the shiftable member 76 photoelectrically. In FIG. 6, the original sheet 6 is placed on the top flat face 16 and inserted into the inserting slot 17. The front edge 6a of the original sheet 6 pushes the bottom end of the shiftable member 76, rotates it from the position of the phantom lines to the position of the solid lines, and is inserted between the feeder rollers 53 and the nip rollers 54. The bottom end of the shiftable member 76 enters the photo sensor 77.

Figure 7:
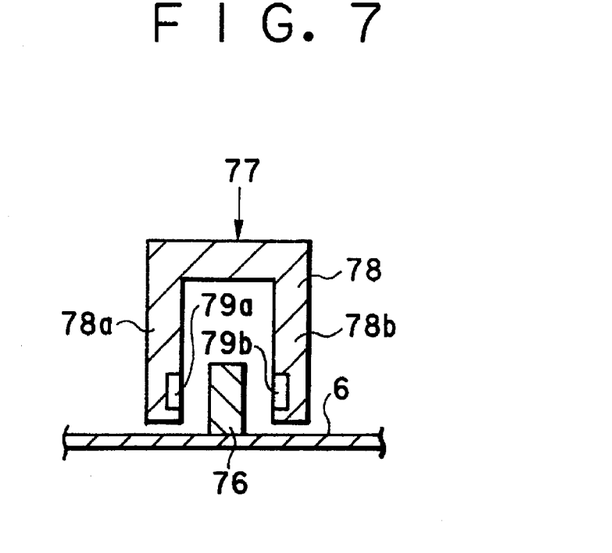
FIG. 7 is a cross section illustrating the sheet detector.

In FIG. 7, the photo sensor 77 is a transmittance type, which includes a sensor support 78, a beam projector 79a and a beam receiver 79b. The sensor support 78 has a channel shape with arms 78a and 78b, inside which the projector and receiver 79a and 79b are respectively incorporated. The shiftable member 76 is shifted to a position between the projector and receiver 79a and 79b, to cause the beam receiver 79b to detect existence of the front edge 6a of the original sheet 6.

Figure 8:
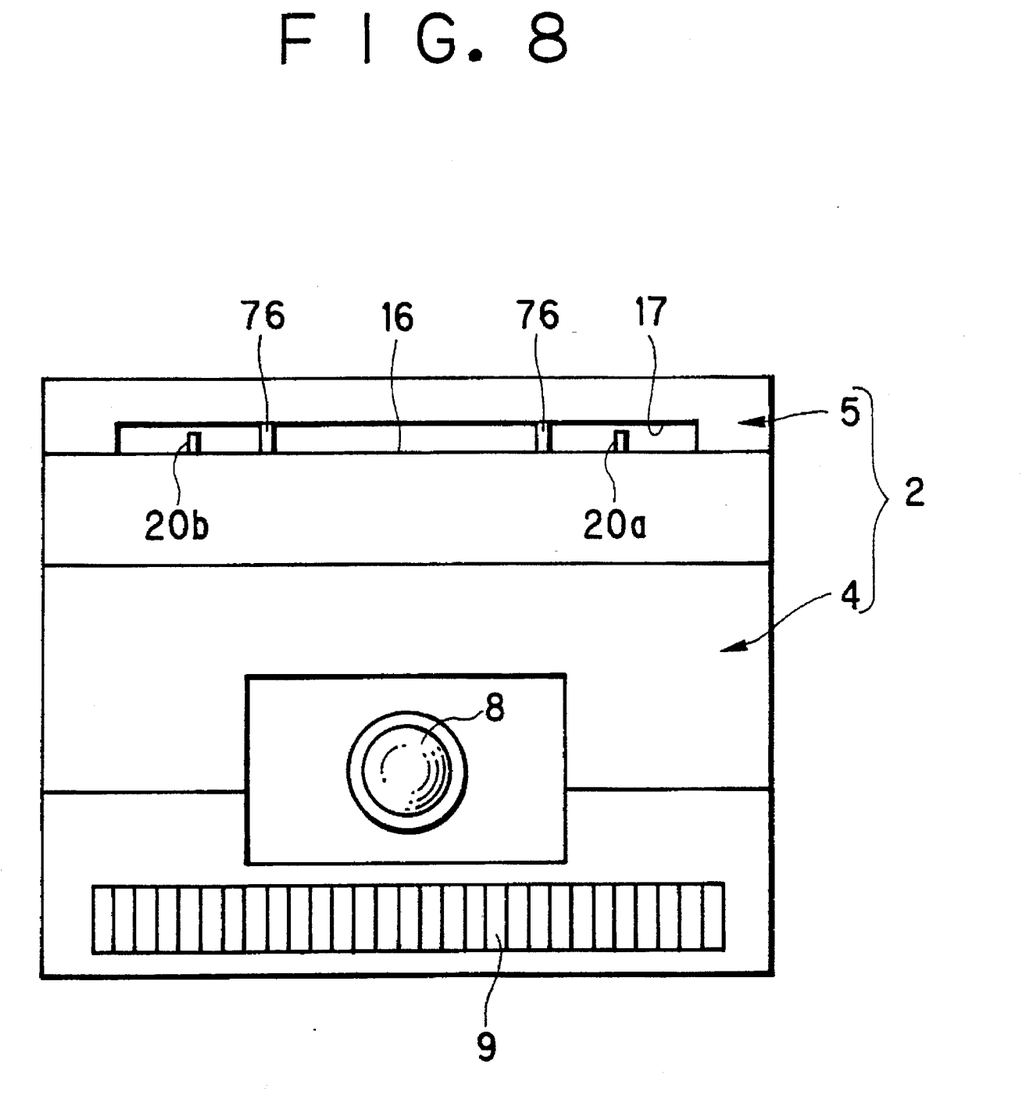
FIG. 8 is a front elevation illustrating the projector.

In FIG. 8, the two sheet detectors are arranged in positions between the guide rails 20a and 20b of the guide rail mechanism 20. If only one of the sheet detectors detects the front edge 6a of the original sheet 6, it is determined that the original sheet 6 is inserted in an inclined improper orientation into the inserting slot 17. A lamp or a buzzer can be added in association with the sheet detectors. When the original sheet 6 being inserted has the inclined improper orientation, the lamp can be caused to blink, or the buzzer can be caused to buzz, for purpose of alarming to users. It is possible to prevent deviation of the original sheet 6 on the stage 29, and avoid jamming the sheet feeder unit 5 with the original sheet 6. Note that the control unit 24 is operated by receiving signals from the sheet detectors, to determine that the original sheet 6 is inserted in an inclined improper orientation into the inserting slot 17.

The sheet detectors operate also for checking orientation of inserting the original sheet 6. For this checking, the number of rotations of the motor 52 is counted during a period between the start and the end of detection of the original sheet 6. The count is evaluated by the control unit 24, to determine whether the original sheet 6 being inserted has the longitudinal or widthwise direction. According to a determined one of the directions, the motor 52 is stopped.

To eject the original sheet 6 from the stage 29, the ejector switch 13 on the lateral face of the projector body 4 is operated. Responsively the motor 52 rotates in reverse to the initial direction for the feeding, to rotate the feeder rollers 53, the conveyor rollers 61, 62 and 63, and the nip rollers 44a–46b. The original sheet 6 is conveyed to the right as viewed in the drawing. The original sheet 6 is passed under the guide plate 66, and exited to the receptacle tray 18.

Figure 9:
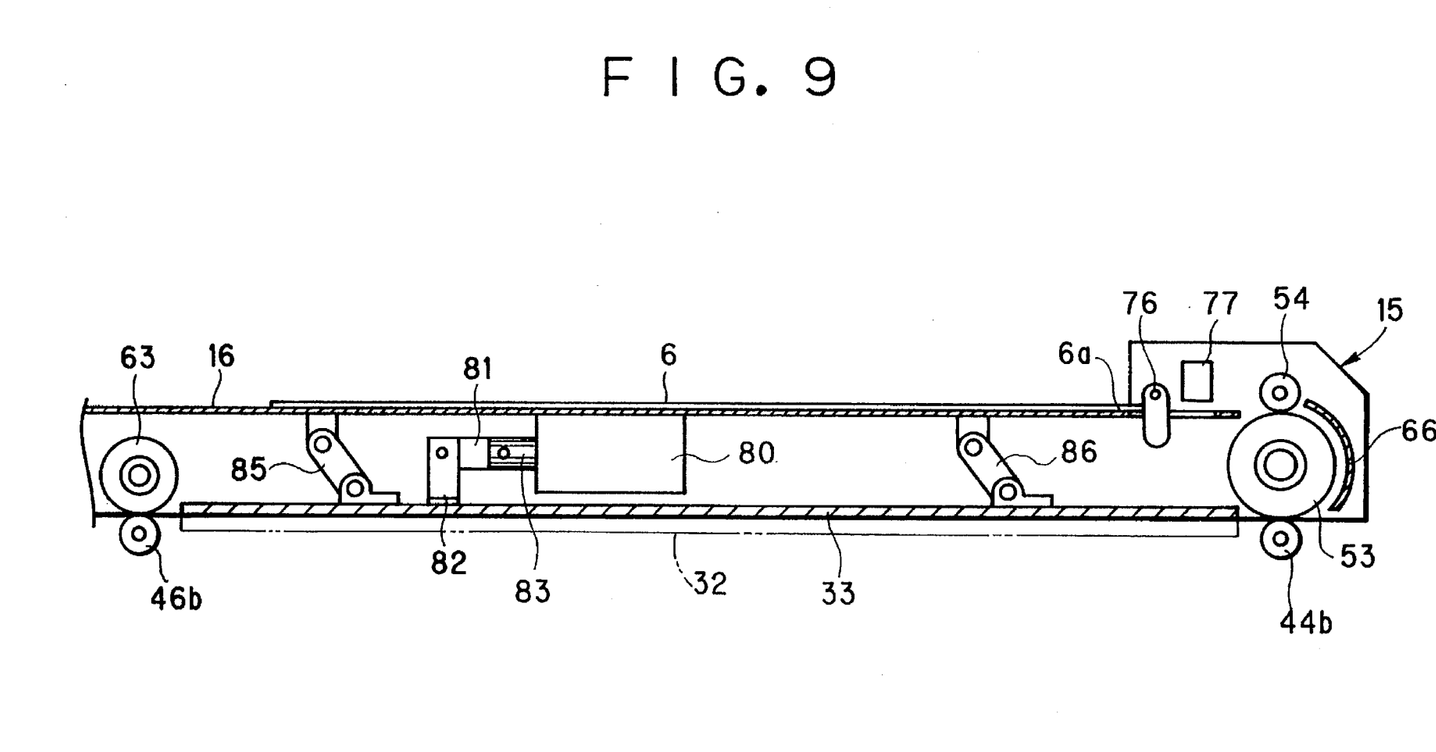
FIG. 9 is a vertical section illustrating a mirror shifter.
Figure 10:
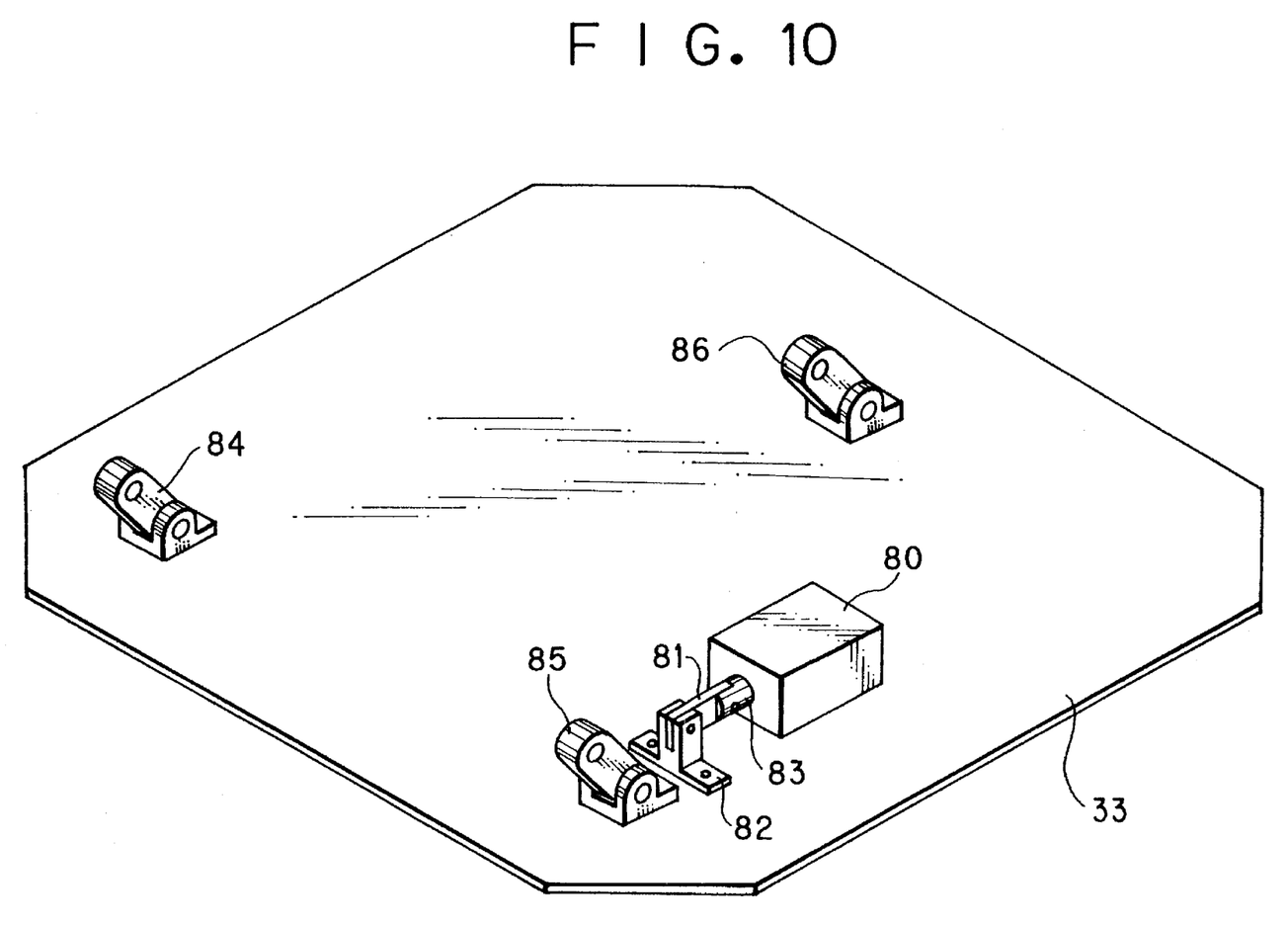
FIG. 10 is a perspective illustrating the mirror shifter.

FIGS. 9 and 10 illustrate the mirror shifter in the sheet feeder unit 5. The mirror shifter is constituted by a solenoid 80 and support levers 84, 85 and 86. The solenoid 80 is secured to a bottom face of the housing 15, and has a plunger or core 83. A tip of the solenoid core 83 is linked with the top reverse face of the Fresnel mirror 33 via a middle stay 81 and a main stay 82. The support levers 84, 85 and 86 have respective first ends mounted on the housing 15 in rotatable fashion, and respective second ends mounted on the top reverse face of the Fresnel mirror 33 in rotatable fashion. The Fresnel mirror 33 is suspended by the support levers 84–86 from the housing 15.

Figure 11:
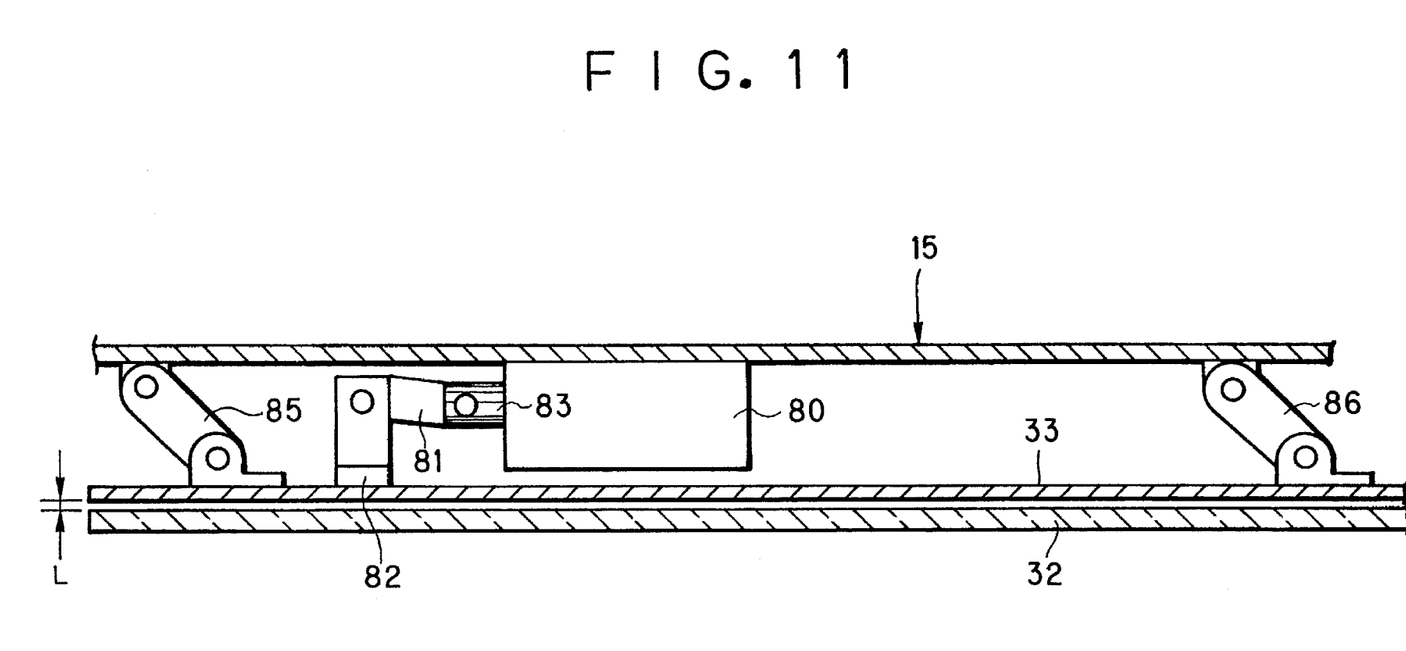
FIG. 11 is a vertical section illustrating shifting operation of the mirror shifter.

The mirror shifter is actuated at the time of starting conveyance of the original sheet 6, namely at the time of detecting the front edge 6a of the original sheet 6 with the sheet detectors, or in response to operation of the ejector switch 13 or the fine adjustor switch 14. When a command of conveying the original sheet 6 is entered, the solenoid 80 is energized to withdraw the solenoid core 83. The solenoid core 83 draws the Fresnel mirror 33 to the right as viewed in the drawings, via the middle stay 81 and the main stay 82, to shift the Fresnel mirror 33 diagonally. In FIG. 11, the Fresnel mirror 33 is suspended by the support levers 84, 85 and 86, and defines the space L between it and the stage plate 32, for the original sheet 6 to pass safely through.

Operation of the projector of the reflection type is described now. In FIG. 1, the projector 2 is installed and directed to the screen 7. The power source switch 10 is turned on. Light from the projecting light source 22 in FIG. 2 is applied to the flat mirror 23, which reflects it toward the stage plate 32. The light is transmitted through the stage plate 32 on the stage 29, and reflected in a convergent manner by the Fresnel mirror 33. Again the light is reflected by the flat mirror 23, and comes incident upon the projecting lens 8, which projects the light to the screen 7.

The interval between the guide rails 20a and 20b of the guide rail mechanism 20 is adjusted for the orientation of the original sheet 6 to be inserted. The original sheet 6 is set between the guide rails 20a and 20b while a face with an image recorded is directed upwards. A top of an image is advanced between the guide rails 20a and 20b. In the present embodiment, the original sheet 6 is advanced in the longitudinal direction. The original sheet 6 is slid on the top flat face 16, and inserted into the inserting slot 17. In FIG. 6, the front edge 6a of the original sheet 6 rotates the shiftable member 76, and is advanced between the feeder rollers 53 and the nip rollers 54.

In FIG. 7, the shiftable member 76 rotated by the original sheet 6 is inserted between the arms 78a and 78b of the photo sensor 77, to intercept the beam receiver 79b optically from the beam projector 79a. Then the front edge 6a of the original sheet 6 is detected. In FIG. 8, if only one of the sheet detectors detects the front edge 6a of the original sheet 6, it is determined that the original sheet 6 has an inclined improper orientation. The lamp is caused to blink, or the buzzer is caused to buzz, for purpose of alarming to users.

When the front edge 6a of the original sheet 6 is detected by the sheet detectors, the solenoid 80 in FIG. 9 is energized to draw the solenoid core 83 back. The solenoid core 83 draws the Fresnel mirror 33 via the middle stay 81 and the main stay 82 to the right in the drawing. The Fresnel mirror 33 drawn by the solenoid 80 is supported by the support levers 84, 85 and 86. In FIG. 11, the space L is formed for the original sheet 6 to be conveyed between the Fresnel mirror 33 and the stage plate 32.

The Fresnel mirror 33 is shifted upwards to form the space L for location of the original sheet 6. The motor 52 of FIG. 5 is driven. The front edge 6a of the original sheet 6 is nipped between the feeder rollers 53 and the nip rollers 54, and conveyed into the sheet feeder unit 5. The original sheet 6 moved to the slot in the sheet feeder unit 5 is conveyed downwards along the guide plate 66.

The front edge 6a of the original sheet 6 is squeezed again between the conveyor rollers 63 and the nip rollers 44a–44c, and conveyed to the stage 29. On the stage 29, the front edge 6a of the original sheet 6 comes to be squeezed between the conveyor rollers 63 and the nip rollers 46a and 46b earlier than the rear edge of the original sheet 6 comes away from the feeder rollers 53 and the nip rollers 44a–44c.

The control unit 24 counts the number of rotations of the motor 52, and measures the period between the start and the end of detection of the original sheet 6. The control unit 24 evaluates the count, to detect the orientation of the original sheet 6, either of the longitudinal and widthwise directions. The original sheet 6 is conveyed as much as associated with the one detected orientation, before the motor 52 is stopped. At the same time the solenoid 80 stops being energized. The Fresnel mirror 33 is shifted down by the gravity on the original sheet 6 while supported by the support levers 84–86. The image of the original sheet 6 is projected to the screen 7.

An image on the screen 7 is observed to focus or zoom the image. If the original sheet 6 is not located in a suitable position, the fine adjustor switch 14 is operated. Upon operating the fine adjustor switch 14, the solenoid 80 is energized. The Fresnel mirror 33 is raised to create the space L. The motor 52 rotates to cause the feeder rollers 53 or the conveyor rollers 63 to move the original sheet 6 stepwise by a minute step on the stage 29.

To exchange the original sheet 6 on the stage 29, the ejector switch 13 is depressed first to eject the original sheet 6 from the stage 29. The depression of the ejector switch 13 drives the solenoid 80, which shifts the Fresnel mirror 33 higher than the stage 29. The motor 52 is rotated in reverse to the feeding direction. The original sheet 6 is squeezed between the feeder rollers 53 and the nip rollers 44a–44c, and ejected to the receptacle tray 18. After the ejection, another transparent original 6 is inserted into the inserting slot 17. Consequently the initial transparent original 6 is replaced with the other transparent original 6.

In the above embodiment, the original sheet 6 is fed to the stage 29 through the rear of the projector body 4 as viewed from the projecting lens 8. Alternatively the original sheet 6 may be fed to the stage 29 through the front of the projector body 4 as viewed from the projecting lens 8. In the above embodiment, the original sheet 6 is ejected from the stage 29 by advancing its rear edge. Alternatively the original sheet 6 may be ejected from the stage 29 by advancing its front edge 6a. In the above embodiment, the original sheet 6 is inserted in the inserting slot 17 by advancing its front edge 6a. Alternatively the original sheet 6 may be inserted in the inserting slot 17 by advancing its rear edge. Also it is possible that the sheet feeder unit 5 being detachable is replaced with a Fresnel mirror unit as a stage cover, to use the reflection type of the projector in a usual manner without the sheet feeder unit 5.

The orientation of the original sheet 6 being inserted is detected in accordance with the number of rotations of the motor 52, but can be detected in accordance with the width of the guide rails 20a and 20b of the guide rail mechanism 20. It is possible to use three or more sheet detectors in the inserting slot 17, so as to check the orientation of the original sheet 6 inserted.

The sheet feeder unit 5 above is externally mounted on the projector body 4 of the projector 2. However the present invention is applicable to the projector 2 in which the sheet feeder unit 5 is unified on the projector body 4.

In the above embodiment, the feeder rollers 53, the conveyor rollers 61, 62 and 63 are used for conveying the original sheet 6. However the conveyor rollers 61, 62 and 63 may be eliminated, while only the feeder rollers 53 are used for conveying the original sheet 6. For this construction, a greatest margin of the original sheet 6 should be oriented as a rear edge for insertion into the inserting slot 17, and should be kept nipped on the feeder rollers 53 while positioned on the stage 29 during for operation of the projection.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A projector of a reflection type, including a transparent stage plate on which a transparent original sheet is set, a light source for illuminating said original sheet through said stage plate, a Fresnel mirror laid on an upside of said original sheet for reflecting light from said original sheet in a convergent manner, a mirror disposed under said stage plate and inclined for reflecting said light from said Fresnel mirror away from said stage plate, and a projecting lens upon which said light from said mirror is incident and which projects an image of said original sheet to a screen, said projector comprising:

a housing for containing said Fresnel mirror in movable fashion;

an inserting slot, formed in said housing, for inserting said original sheet into said housing during supply of said original sheet;

a sheet detector for detecting a front edge of said original sheet inserted through said inserting slot;

a position detector for detecting that said original sheet is set on said stage plate;

an ejector switch operated for ejection of said original sheet;

a mirror shifter, disposed in said housing, for shifting said Fresnel mirror from a set position to a raised position in response to a signal from said sheet detector or said ejector switch, and for shifting said Fresnel mirror from said raised position to said set position in response to a signal from said position detector, wherein said Fresnel mirror in said set position is laid on said original sheet, and said Fresnel mirror in said raised position is raised away from said stage plate; and a sheet feeder mechanism, disposed in said housing, for moving said original sheet from said inserting slot to said stage plate during said supply, and for moving said original sheet out of said housing during said ejection of said original sheet.

2. A projector of a reflection type as defined in claim 1, further comprising a cabinet for containing said light source, said mirror and said projecting lens, and a stage opening which is formed in said cabinet and in which said stage plate is secured.

3. A projector of a reflection type as defined in claim 2, wherein said housing is mounted on said cabinet in pivotal fashion.

4. A projector of a reflection type as defined in claim 2, further comprising an exit slot formed in said housing and located in an extension of said stage plate, said original sheet being passed through said exit slot to be ejected.

5. A projector of a reflection type as defined in claim 4, further comprising a top flat face, formed on said housing, for placing said original sheet, and a protruding portion disposed on a side of said housing, said inserting slot being formed in said protruding portion and adjacent to said top flat face.

6. A projector of a reflection type as defined in claim 5, wherein said sheet feeder mechanism includes:

a feeder roller for turning upside down said original sheet inserted through said inserting slot, and for conveying said original sheet toward said stage plate;

a first nip roller, disposed above said feeder roller, for pressing said original sheet to said feeder roller;

a second nip roller, disposed under said feeder roller, for pressing said original sheet to said feeder roller; and a motor for rotating said feeder roller.

7. A projector of a reflection type as defined in claim 6, wherein said sheet feeder mechanism further includes:

at least one conveyor roller, disposed beside said Fresnel mirror, driven by said motor, for conveying said original sheet from said feeder roller on said stage plate; and at least one third nip roller, disposed under said conveyor roller, for pressing said original sheet to said conveyor roller.

8. A projector of a reflection type as defined in claim 6, wherein said exit slot is located in front of said second nip roller, and said motor is rotated in a first direction during said supply, to set said original sheet on said stage plate, and rotated in a second direction during said ejection, to exit said original sheet through said exit slot.

9. A projector of a reflection type as defined in claim 8, wherein said feeder roller is disposed in said housing, and said first and second nip rollers are disposed in said cabinet.

10. A projector of a reflection type as defined in claim 9, wherein said sheet detector includes:

at least one shiftable member, disposed inside said protruding portion, pressed and shifted by a front edge of said original sheet being inserted in said inserting slot; and at least one photo sensor, disposed inside said protruding portion, for photoelectrically detecting a shift of said shiftable member, to recognize insertion of said front edge of said original sheet.

11. A projector of a reflection type as defined in claim 10, wherein said at least one shiftable member comprises two shiftable members arranged along said inserting slot, and said at least one photo sensor comprises two photo sensors arranged along said inserting slot;

further comprising an orientation detector for evaluating signals from said two photo sensors, wherein if said signals are equal to each other, then said orientation detector determines that said original sheet is oriented acceptably, and if said signals are different from each other, then said orientation detector determines that said original sheet is oriented in inclination.

12. A projector of a reflection type as defined in claim 9, wherein said mirror shifter includes:

a solenoid, having a solenoid core oriented in a substantially horizontal direction; and a linking mechanism for linking said solenoid core with said Fresnel mirror to transmit motion of said solenoid core to said Fresnel mirror, said solenoid being driven to shift said Fresnel mirror from said set position to said raised position.

13. A projector of a reflection type as defined in claim 12, wherein said mirror shifter further comprising plural support levers, each of which has a first end secured to said housing in swingable fashion, and a second end secured to said Fresnel mirror in swingable fashion, said support levers rendering said Fresnel mirror movable substantially in parallel between said set position and said raised position.

14. A projector of a reflection type as defined in claim 6, further comprising an arc-like guide plate, disposed to confront with a portion of a periphery of said feeder roller between said first and second nip rollers, there being an arc-like path between said guide plate and said feeder roller, for guiding said front edge of said original sheet toward said second nip roller.

15. A projector of a reflection type as defined in claim 14, further comprising a receptacle tray member, secured to said housing, for receiving said original sheet ejected from said exit slot.

16. A projector of a reflection type as defined in claim 15, further comprising a pair of guide rail members, disposed on said top flat face of said housing, for regulating respective lateral edges of said original sheet.

17. A projector of a reflection type as defined in claim 16, wherein said first and second nip rollers are biased upwards by respective bias members.

* * * * *